Aug. 6, 1935.  W. A. WEAVER  2,010,385
AUTOMOBILE LICENSE PLATE HOLDER
Filed Dec. 4, 1934  2 Sheets-Sheet 1
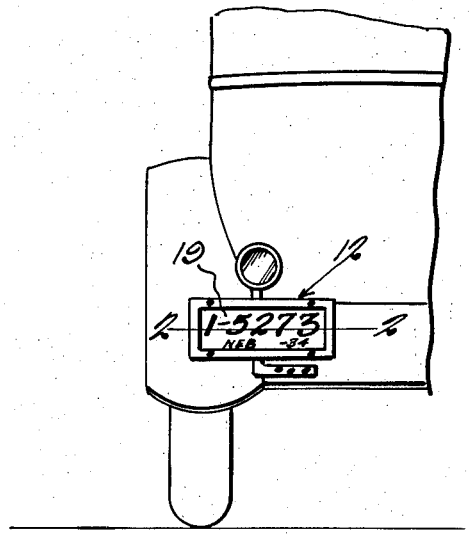
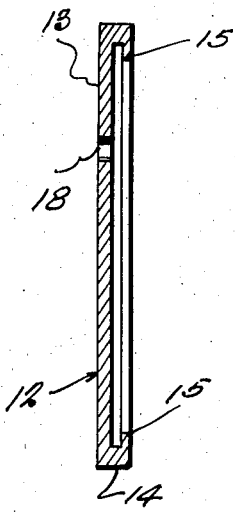
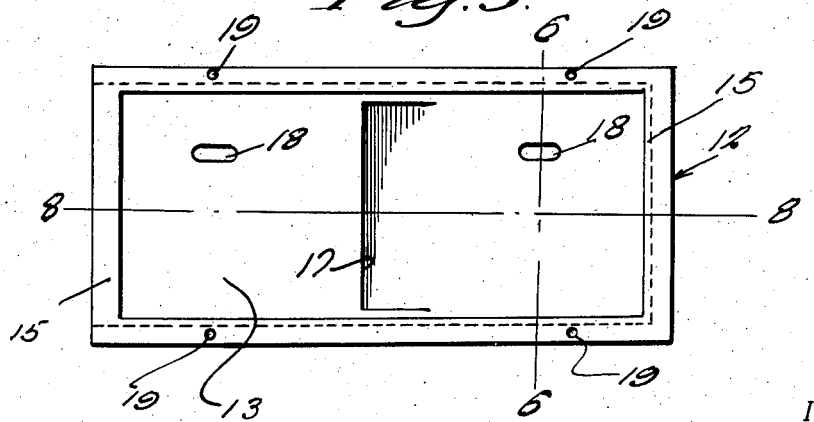
Inventor
Walter A. Weaver.
By *Clarence A. O'Brien*
Attorney Aug. 6, 1935.   W. A. WEAVER   2,010,385
AUTOMOBILE LICENSE PLATE HOLDER
Filed Dec. 4, 1934   2 Sheets-Sheet 2
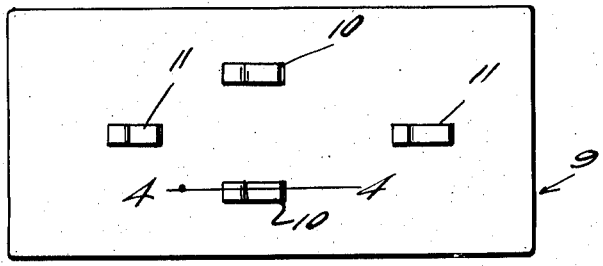
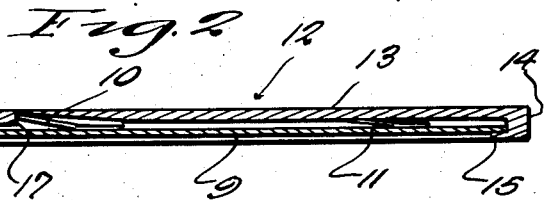
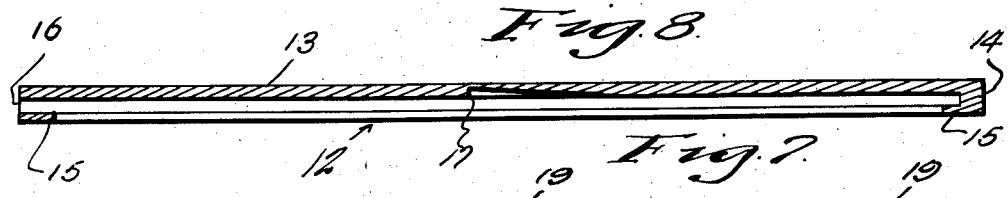
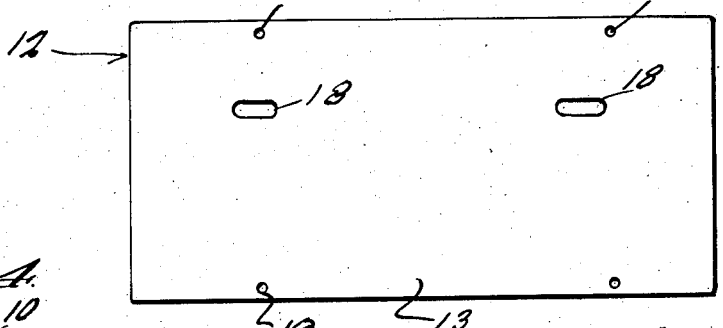
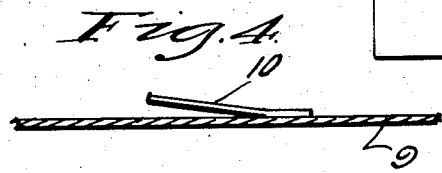
Inventor
Walter A. Weaver
By Clarence A. O'Brien
Attorney Patented Aug. 6, 1935

2,010,385

UNITED STATES PATENT OFFICE 2,010,385

AUTOMOBILE LICENSE PLATE HOLDER

Walter A. Weaver, North Platte, Nebr.

Application December 4, 1934, Serial No. 755,944

2 Claims. (Cl. 40—125)

This invention relates to that class of inventions having to do with automobile and similar vehicle license plate and tag constructions.

My principal aim is to provide a new and useful improvement made up essentially of two primary parts; namely, a special plate and a companion holder therefor, wherein when the plate is placed in the holder it cannot be removed by unauthorized persons unless it is practically destroyed in so doing.

It is a matter of common knowledge that the practice of thieves stealing automobile license plates and/or tags and transferring them from one car to another is alarming. Not only this it is frequently the practice when an automobile is stolen to find that the original identification plates have been removed and replaced with other makeshift and frequently illegal plates.

The purpose of the present invention is to provide a non-removable license plate or tag which will tend to forestall such undesirable tactics. This is accomplished by the adoption and use of a plate which when once placed in its holder cannot be removed therefrom unless it is practically defaced, whereby to prevent it from being transferred or reused for ulterior purposes.

Other features and advantages will become more readily apparent from the following description and drawings.

In the drawings:

Figure 1 is a rear elevational view showing a fragmentary portion of an automobile equipped with the improved license plate or tag and holder construction.

Figure 2 is a horizontal sectional view taken approximately on the plane of the line 2—2 of Figure 1, the view being enlarged for demonstration purposes.

Figure 3 is an elevational view of the special clip equipped side or face of the license tag.

Figure 4 is a detail section on the line 4—4 of Figure 3.

Figure 5 is an elevational view of the special tag holder or sheath with the tag removed for clearness of illustration.

Figure 6 is a vertical or transverse sectional view taken approximately on the plane of the line 6—6 of Figure 5.

Figure 7 is a view of Figure 5 looking at it in reverse.

Figure 8 is a longitudinal sectional view at right angles to Figure 6, the section being on the line 8—8 of Figure 5.

Attention is first invited to Figure 3 wherein it will be observed that the license plate or tag is denoted by the numeral 9. This is of customary rectangular plate form and is provided with the conventional indicia and other identification means on its outer face. The opposite or inner face is provided with a plurality of spring clips. At the center and one above the other are latch or retention clips 10. Adjacent the opposite end and at longitudinally spaced points are anti-rattling and stabilizing clips 11.

The sheath like holder for the plate is distinguished by the numeral 12. It is of proper proportions and shape to accommodate the tag 9. It therefore embodies a rectangular plate 13 having a marginal laterally disposed rim 14 carrying flanges 15 bent into parallelism to the plate portion and functioning as a retaining frame for the tag. The rim is cut away at one end to provide a slot as indicated at 16 in Figure 8 which slot serves to facilitate insertion and placement of the tag in the holder. It will be noticed that the holder is provided at its center with a vertical recess 17 of proper proportion serving as a keeper seat for the latches 10. In addition it is provided with elongated slots 18 and a plurality of rivet holes 19 to permit it to be fastened permanently to rigidly mounted attaching brackets on the automobile. Although the novelty of this invention resides primarily in the particular construction of the license plate and its holder, it is evident that the device, as a whole, must be rigidly attached to the vehicle by suitable means so as to frustrate any effort or attempt to remove it bodily.

In practice it is obvious that the tag 9 is slipped into the holder 12 through the entrance slot 16 so that it occupies the position shown in Figure 2. When in this position the latches 10 snap into the keeper seat 17, while the clips 11 serve to press the plate outwardly against the flanges of the so-called retaining frame 15. When once the tag is in this position it is held against removal and against undue chattering.

It is to be explained that the purpose of the slot 18 is to allow suitable tools or instruments such as punches to be forced through the holder from the back to strike against the tag and to bend and bow it outwardly to an extent to permit it to be pulled out with a pair of pliers. In doing this it is obvious that the license tag is virtually destroyed, or at any rate so markedly defaced as to render it unfit for subsequent use. It is further evident that with this arrangement the holder 12 can be used over and over and when it becomes necessary to replace the tag on the customary annual basis and since its use is no further needed it is perfectly proper to resort to the use of these slots 18 and tools to dislodge the tag. The dislodging of course will be done by the owner of the car or a suitably designated mechanic or person. It might also be mentioned that the metal plate or tag can be dislodged by cutting or tearing into it from the front and then using pliers to pull it out from the holding frame.

The gist of the invention will be found in the provision of a sheath like holder for the tag or plate 9 wherein said holder is provided with a marginal rim 14 and a frame 15 carried thereby and disposed in spaced parallelism to the plate portion 13 to receive the tag 9. The tag 9 is of special construction in that it includes the latch forming clips 16 which snap into the keeper seat 17 and prevent unauthorized removal of the tag. The clips 11 are simply used as anti-rattler elements and the openings 18 as a means to remove the tag if and when absolutely necessary.

In the succeeding claims it will be understood that the expression "sheath-like holder" is intended to apply to the unitary part 12 and that this is provided with a marginal rim 14 open at one end as at 16 to facilitate insertion of the tag and provided with a retention frame 15 to hold the tag in place. This holder embodies the plate like portion 13 and the centralized keeper recess 17 and the tool openings 18 to facilitate use of a tool if and when necessary.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described my invention, what I claim as new is:

1. In a structure of the class described a tag holder comprising a rectangular plate provided at its center with a keeper recess, provided with a marginal rim open at one end to permit insertion of the tag, said rim being provided with a tag retaining frame disposed in spaced parallelism with respect to said plate, a tag insertable into said holder through said opening, said tag being provided on its inner face with resilient retaining latches engageable in said keeper recess, and said tag being further provided with anti-rattler clips engageable with said plate, and said plate being provided with tool slots in the manner and for the purpose described.

2. In a structure of the class described, a license plate holder comprising a backing member for the license plate, said backing member being provided at a predetermined point with a recess constituting a keeper and formed with a marginal rim having a slot at one end to permit non-removable insertion of said license plate, said rim being provided with a frame occupying a position at right angles to the rim and located in spaced parallelism with respect to said backing member, a license plate insertable into said holder by way of said slot, that face of the license plate opposed to the recessed surface of said backing member being provided with a resilient retaining latch designed to snap into said keeper to prevent withdrawal of the plate through the aforesaid slot, and a plurality of resilient anti-rattling clips interposed between the backing member and license plate to substantially eliminate shaking and rattling of the plate in said holder.

WALTER A. WEAVER.